United States Patent [19]

Tanamachi et al.

[11] Patent Number: 5,361,196
[45] Date of Patent: Nov. 1, 1994

[54] POWER CONVERTER FOR CONVERTING DC VOLTAGE INTO AC PHASE VOLTAGE HAVING THREE LEVELS OF POSITIVE, ZERO AND NEGATIVE VOLTAGE

[75] Inventors: Tokunosuke Tanamachi, Katsuta; Kiyoshi Nakata, Iwase; Kiyoshi Nakamura, Katsuta, all of Japan

[73] Assignee: Hitachi, Ltd., Tokyo, Japan

[21] Appl. No.: 49,858

[22] Filed: Apr. 20, 1993

[30] Foreign Application Priority Data

Apr. 24, 1992 [JP] Japan .................................. 4-106413

[51] Int. Cl.[5] .......................................... H02M 7/515
[52] U.S. Cl. ........................................ 363/41; 363/98; 363/132; 318/811
[58] Field of Search ................ 363/41, 43, 56–58, 363/95, 96, 98, 135–138, 132, 131, 37; 318/800–802, 811

[56] References Cited

U.S. PATENT DOCUMENTS

| | | |
|---|---|---|
| 4,386,396 | 5/1983 | Angquist ............................ 363/136 |
| 4,953,069 | 8/1990 | Braun et al. ........................ 363/41 |
| 5,060,129 | 10/1991 | Maruyama ........................... 363/41 |
| 5,155,675 | 10/1992 | Maruyama et al. .................... 363/98 |

OTHER PUBLICATIONS

Novel Approach to the Generation and Optimization of three level PWM Waveforms PESC. '88 Record, Apr. 1988 pp. 1255–1262.
Balancing of DC Input Capacitor Voltages of an NPC Inverter (Material of the Society of Study), Japanese Association of Electronic Engineering Society for Studying of Semiconductor Power conversion, SPC-9-1-31, Jun. 1991, pp. 111–120.

Primary Examiner—Steven L. Stephan
Assistant Examiner—Adolf Berhane
Attorney, Agent, or Firm—Antonelli, Terry, Stout & Kraus

[57] ABSTRACT

An apparatus for a three-level DC/AC converter, in which the width of output pulse having the same polarity as the fundamental wave of the converter output phase voltage is adjusted depending upon the DC component of a differential voltage between two DC voltages in a dipolar modulation system of the converter. Whereby, the imbalance of DC components between the two DC voltages is easily and effectively suppressed.

18 Claims, 14 Drawing Sheets

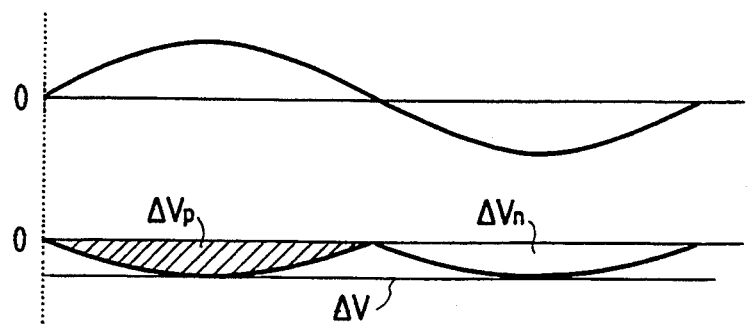
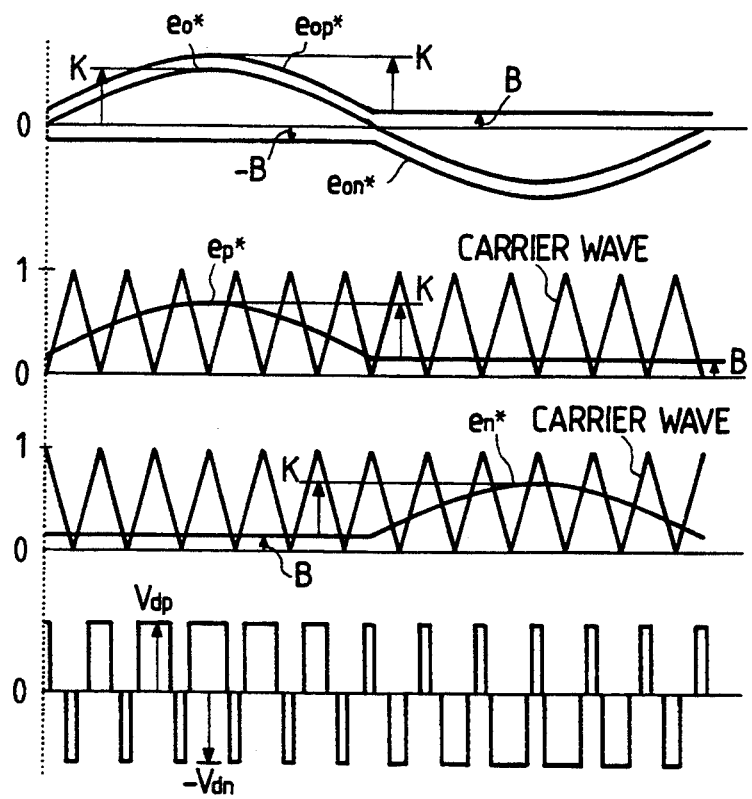

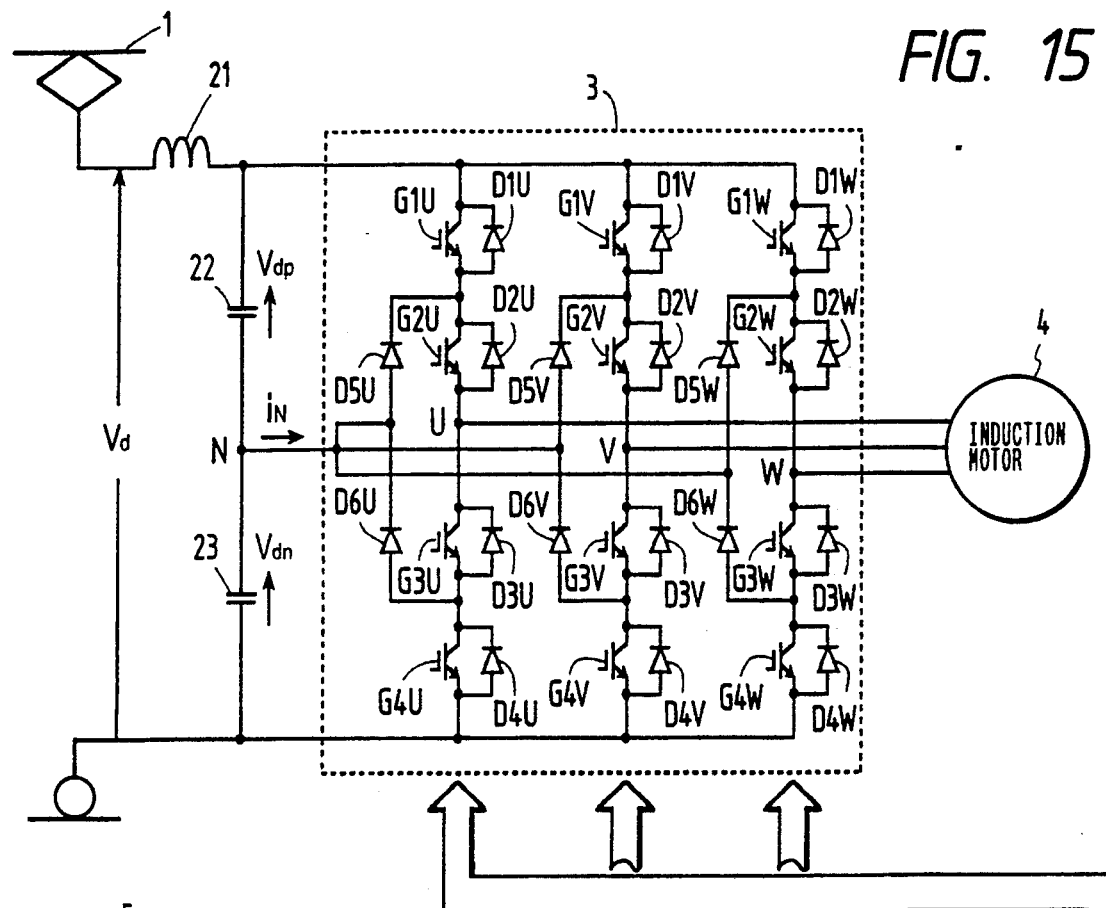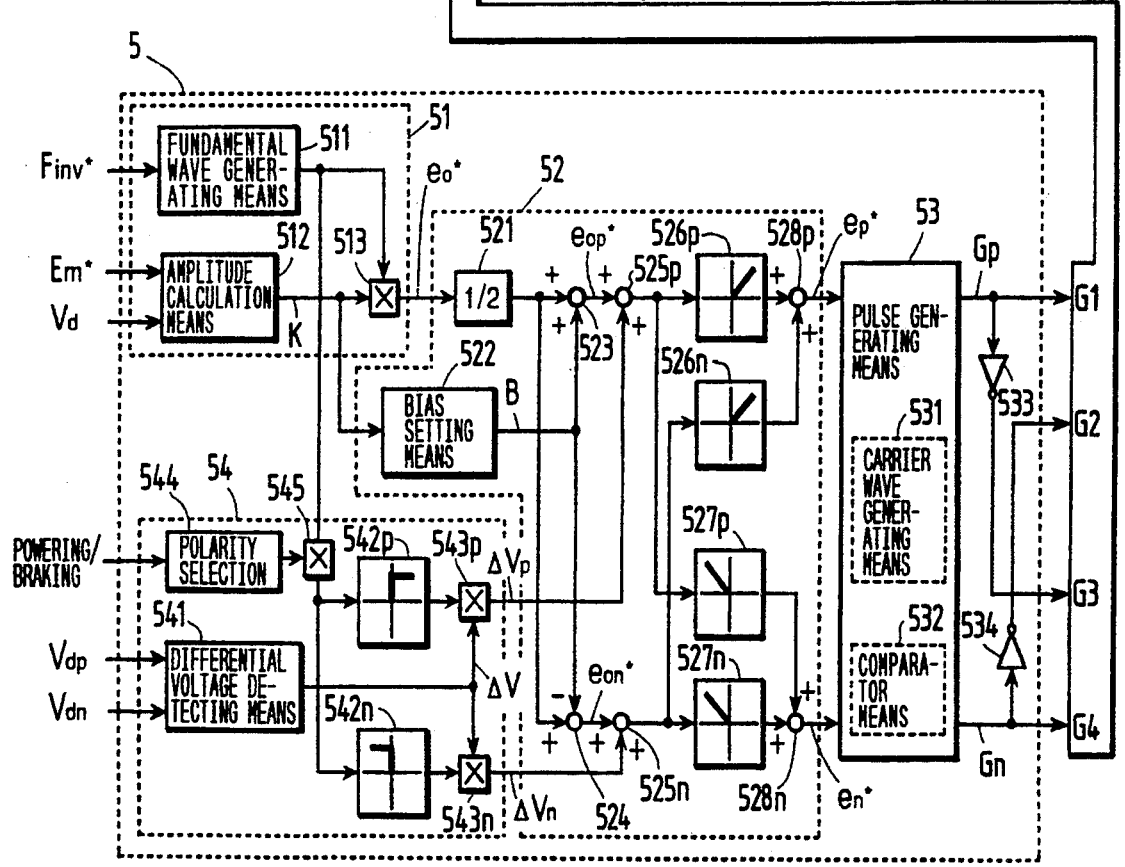
FIG. 15

POWER CONVERTER FOR CONVERTING DC VOLTAGE INTO AC PHASE VOLTAGE HAVING THREE LEVELS OF POSITIVE, ZERO AND NEGATIVE VOLTAGE

BACKGROUND OF THE INVENTION

This invention relates to an apparatus for controlling a power converter which converts a DC voltage fed from a DC voltage dividing capacitors that are connected in series into an AC phase voltage having positive, zero and negative three potentials.

When a load such as an induction motor is to be driven by a pulse-width modulation invertor, it is desired that the AC output voltage of the invertor contains harmonic components as little as possible.

To satisfy this requirement, there has been proposed an invertor called a three-level invertor.

Such an invertor has been proposed in, for example, "A Novel Approach to the Generation and Optimization of Three-Level PWM Wave Forms" (PESC '88 Record, April 1988), pp. 1255-1262 (hereinafter referred to as literature 1). This literature 1 proposes a dipolar modulation system which alternatingly outputs positive and negative pulse voltages via zero voltage as a modulation system suited for improving the wave forms and for controlling very small voltages of the three-level invertor. voltage utilization factor decreases since very small voltages are controlled by using pulses having a polarity opposite to the fundamental wave of the output phase voltage. This literature 1 further describes a control system which features a high voltage utilization factor, i.e., describes the shifting toward a unipolar modulation system which outputs a plurality of pulse voltages having only the same polarity as the fundamental wave of the output phase voltage.

On the other hand, problems inherent in the three-level invertor will be represented by such phenomena as imbalance in the capacitances of the capacitors that are connected in series to divide a DC voltage into two, and imbalance in the DC components between the divided two DC voltages caused by DC components of a current flowing into and out of a point at which the capacitors are connected in series due to variance in the output pulses from the invertor. Technologies which suppress this imbalance have been disclosed in Japanese Patent Laid-Open No. 101969/1990 and in "Balancing of DC Input Capacitor Voltages of an NPC Invertor" (Material of the Society of Study, Japanese Association of Electric Engineering, Society for Studying Semiconductor Power Conversion, SPC-91-37, 1991/6), pp. 111-120 (hereinafter referred to as literature 2).

According to the technology for suppressing imbalance of DC components between the two DC voltages disclosed in Japanese Patent Laid-Open No. 101969/1990, the amplitudes of two modulated waves of sinusoidal shapes are changed in the dipolar modulation system of the literature 1 . As will be described later, however, this technology causes the shifting amount (bias amount) to be changed, too. To bring the change back, the shifting amount must be adjusted again in the latter stage of control, causing the control operation to become complex.

According to the technology of suppressing the imbalance of DC components between the two DC voltages disclosed in the literature 2, a signal corresponding to a DC component of a differential voltage between the two DC voltages is superposed on an invertor voltage instruction in the unipolar modulation system of the literature 1.

Now, when the above-mentioned three-level invertor is adapted to an electric car, the output voltage is continuously controlled from zero through up to near a possible maximum voltage. Therefore, it becomes necessary to shift the modulation system (modulation mode) from the dipolar modulation system (modulation mode) into the unipolar modulation system (modulation mode).

Here, however, the circuit constitution and control operation become complex if the above-mentioned technologies for suppressing the imbalance of DC components between the two DC voltages are adapted depending upon the modulation systems.

SUMMARY OF THE INVENTION

The object of the present invention is to suppress the imbalance of DC components between the two DC voltages simply and efficiently in the dipolar modulation system (modulation mode).

Another object of the present invention is to simplify the operation for suppressing the imbalance of DC components between the two DC voltages in an electric car to which are adapted the dipolar modulation system (modulation mode) and another modulation system (modulation mode).

The above-mentioned object is achieved by an apparatus for controlling a power converter comprising capacitors connected in series to divide a DC voltage; a DC/AC converter for converting direct current fed from said capacitors into an AC-phase voltage having positive, zero and negative levels; a modulation means for supplying said DC/AC converter with a signal for generating a sequence of alternating output pulses with interleaving zero-level pulses, the sequence of pulses corresponding to half the period of a fundamental wave of the output phase voltage of the DC/AC converter; and a means for adjusting the width of either the positive output pulse or the negative output pulse of said output phase voltage depending upon the DC component of a difference between said divided voltage.

Another object of the present invention is achieved by an apparatus for controlling an electric car comprising capacitors connected in series to divide a DC voltage; a DC/AC converter for converting direct current fed from said capacitors into an AC-phase voltage having positive, zero and negative levels; an AC motor driven by said DC/AC converter; a modulation means which has a first modulation mode in which said DC/AC converter is supplied with a signal for generating a sequence of alternating output pulses with interleaving zero-level pulses in response to a voltage instruction and a frequency instruction fed to said DC/AC converter, the sequence of pulses corresponding to half the period of a fundamental wave of the output phase voltage of the DC/AC converter contains the zero potential, and a second modulation mode in which said DC/AC converter is supplied with a signal for generating a sequence of output pulses different from the sequence of output pulses of said first modulation mode; and a single DC component imbalance suppressing means which suppresses the imbalance of DC components between said divided DC voltages in said first modulation mode and in said second modulation mode.

In the dipolar modulation system, the width of an output pulse having one polarity of the output phase voltage is adjusted depending on the DC component of a differential voltage between the divided two DC voltages, in order to control the DC component of a current that flows into or out of a point where the capacitors are connected in series. Therefore, the imbalance of DC components between the two DC voltages is suppressed requiring a simple control operation and efficiently.

In the electric car to which are adapted the dipolar modulation system and another modulation system, furthermore, a means for suppressing the imbalance of DC component between the two DC voltages is commonly used irrespective of the modulation system, contributing to simplifying the control operation.

BRIEF DESCRIPTION OF THE DRAWINGS

FIG. 13 is a diagram illustrating a signal corresponding to a DC component of a differential voltage between the two DC voltages.

FIG. 14 is a diagram illustrating the operation of a dipolar modulation different from the dipolar modulation of FIG. 2.

FIG. 15 is a diagram of a circuit constitution illustrating an another embodiment of the present invention.

DETAILED DESCRIPTION OF THE PREFERRED EMBODIMENT

Figure 1:
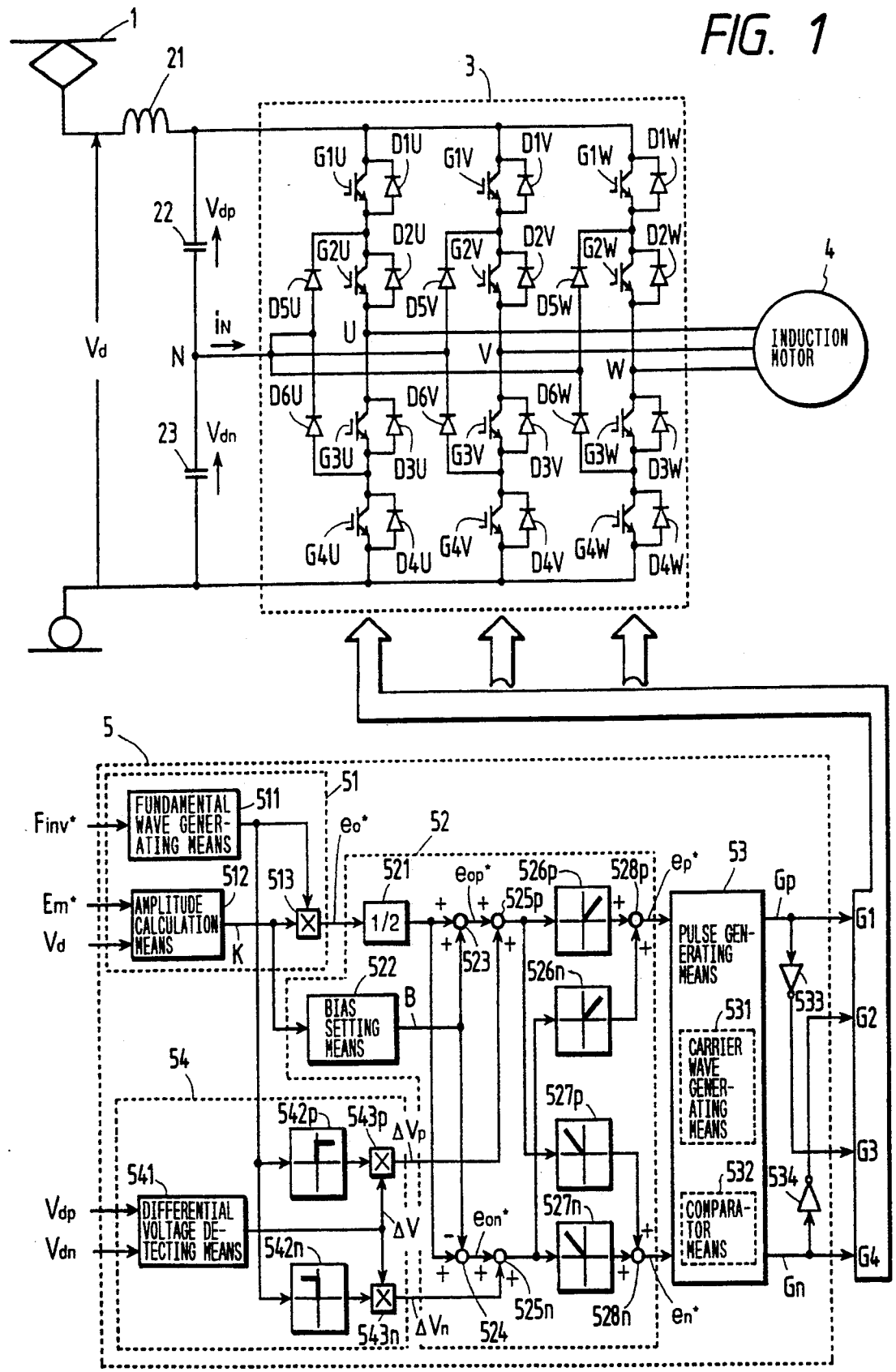
FIG. 1 is a diagram of a circuit constitution illustrating an embodiment of the present invention.

FIG. 1 shows a circuit constitution according to an embodiment of the present invention.

Reference numeral 1 denotes a DC trolley wire, 21 denotes a reactor for smoothing the current, 22 and 23 denote voltage-dividing capacitors that are connected in series to divide the voltage $V_d$ of the DC stringing 1 into two DC voltages $V_{db}$ and $V_{dn}$, reference numeral 3 denotes a pulse-width modulation three-level invertor which converts two DC voltages into a three-phase AC voltage, and reference numeral 4 denotes an induction motor driven by the invertor 3.

The invertor 3 comprises three level-switching arms of U-phase, V-phase and W-phase. The switching arm of the U-phase (V-phase, W-phase) is made up of switching elements (such as IGBT, GTO, power transistors, etc.) G1U to G4U (G1V to G4V, G1W to G4W) which are capable of extinguishing the arc by themselves, rectifier elements (fly wheel diodes) D1U to D4U (D1V to D4V, D1W to D4W), and auxiliary rectifier elements (cramping diodes) D5U to D6U (D5V to D6V, D5W to D6W).

The points at which the auxiliary rectifier elements D5U and D6U, D5V and D6V, and D5W and D6W are connected together, are connected to a point (hereinafter referred to as neutral point) N at which the voltage-dividing capacitors 22 and 23 are connected in series. The turn-on and -off operations of the switching elements G1U to G4U, G1V to G4V and G1W to G4W shown in Table 1 are carried out by the output of the modulation means 5, and voltages (phase voltages) of three levels $V_{dp}$, 0 and $-V_{dn}$ are output between the neutral point N and the output terminals U, V and W.

TABLE 1

| Switching condition | | | | Output phase voltage |
|---|---|---|---|---|
| G1U (G1V G1W) | G2U (G2V G2W) | G3U (G3V G3W) | G4U (G4V G4W) | voltage across U–N voltage across V–N voltage across W–N |
| on | on | off | off | $V_{dp}$ |
| off | on | on | off | 0 |
| off | off | on | on | $-V_{dn}$ |

Next, the constitution of the modulation means 5 and the dipolar modulation will be described with reference to FIGS. 1 and 2. These drawings illustrate those of one phase only.

An output frequency instruction Finv* of the invertor 3 is given by the addition and subtraction of a rotating frequency of the motor 4 and a slip frequency that is obtained based on a deviation between a current instruction for the motor 4 and a real current of the motor 4. In a fundamental wave voltage instruction generating means 51, a fundamental wave (sin) generating means 511 outputs a fundamental sinusoidal wave upon receipt of the invertor output frequency instruction $F_{inv}$*, and an amplitude calculation means 512 calculates and outputs a fundamental wave voltage amplitude instruction K based on the voltage Vd of the DC trolley wire 1 and an effective value instruction $E_m$* of output voltage which is proportional to the invertor output frequency instruction $F_{inv}$*. The fundamental wave voltage amplitude instruction K and the fundamental sinusoidal wave are multiplied through a multiplier 513 to output an instantaneous fundamental wave voltage instruction $e_0$* as shown in FIG. 2(a).

In a voltage instruction dividing means 52, the fundamental wave voltage instruction $e_0$* input from the fundamental wave voltage instruction generating means 51 is divided into ½ through a divider 521, and to this signal is added or from this signal is subtracted a bias amount B (this range is a condition for the dipolar modulation) that is set by a bias setting means 522 to be larger than K/2 but smaller than 0.5 through an adder 523 or a subtractor 524, thereby to form two divided voltage instructions $e_{op}$* and $e_{on}$* of a sinusoidal shape as shown in FIG. 2(a). From the thus divided voltage instructions $e_{op}$* and $e_{on}$* a positive-side voltage instruction $e_p$* shown in FIG. 2(b) is formed through polarity discrimination/distributors 526p, 526n and an adder 528p, and a negative-side voltage instruction $e_n$* shown in FIG. 2(c) is formed through polarity discrimination/-distributors 527p, 527n and an adder 528n.

In a pulse generating means 53, a comparator means 532 compares the positive-side voltage instruction $e_p^*$ and negative-side voltage instruction $e_n^*$ input from the voltage instruction dividing means 52 with triangular waves such as those shown in FIGS. 2(b) and 2(c) that are output from a carrier wave generating means 531, and outputs a pulse signal $G_p$ such as the one shown in FIG. 2(d) and a pulse signal $G_n$ such as the one shown in FIG. 2(g).

The pulse signals $G_p$ and $G_n$ serve as gate signals for the switching elements G1 and G4, and the signals like those shown in FIGS. 2(e) and 2(f) obtained by inverting the pulse signals $G_p$ and $G_n$ through inverters 533 and 534 serve as gate signals for the switching elements G3 and G2. Accordingly, as shown in FIG. 2(h), the invertor 3 alternatingly outputs, as output phase voltages, a positive pulse voltage of a height equal to the voltage $V_{dp}$ of the capacitor 22 and a negative pulse voltage of a height equal to the voltage $V_{dn}$ of the capacitor 23 via zero voltage.

Figure 2:
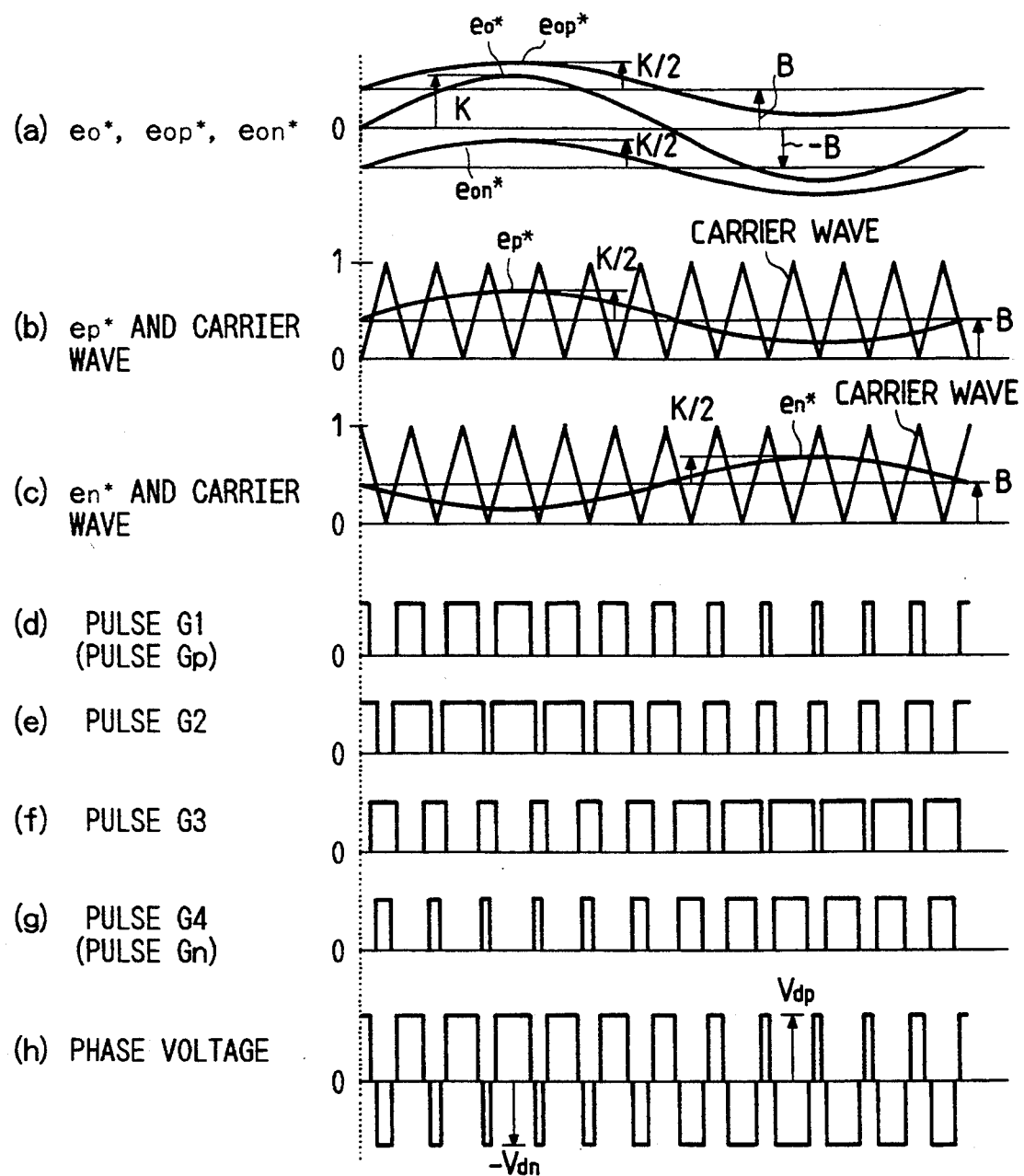
FIG. 2 is a diagram illustrating the operation of a dipolar modulation.

In the dipolar modulation of FIG. 2, when the bias amount B set by the bias setting means 522 becomes greater than the fundamental wave voltage amplitude instruction K/2, the divided voltage instructions $e_{op}^*$ and $e_{on}^*$ become as shown in FIG. 3a), the negative-side voltage instruction $e_p^*$ becomes as shown in FIG. 3(b), and the negative-side voltage instruction $e_n^*$ becomes as shown in FIG. 3c). As a result, the invertor 3 performs a so-called partial dipolar modulation outputting, as output phase voltages, pulse voltages as shown in FIG. 3(d) in which there exist a period of outputting positive and negative pulse voltages alternatingly via zero voltage and a period of outputting a pulse voltage of the same polarity as the fundamental wave.

In the dipolar modulation of FIG. 2, when the bias amount B set by the bias setting means 522 becomes zero, the divided voltage instructions $e_{op}^*$ and $e_{on}^*$ become as shown in FIG. 4(a), the positive-side voltage instruction $e_p$ becomes as shown in FIG. 4(b) and the negative-side voltage instruction $e_n^*$ becomes as shown in FIG. 4(c). Referring to FIGS. 3(b) and 3(c), the voltage instruction having the same polarity as the fundamental wave voltage instruction $e_0^*$ is distorted because of the reason that a voltage of the opposite polarity is output. As a result, the invertor 3 performs a so-called unipolar modulation which outputs a pulse voltage of the same polarity as the fundamental wave as shown in FIG. 4(d).

Figure 4:
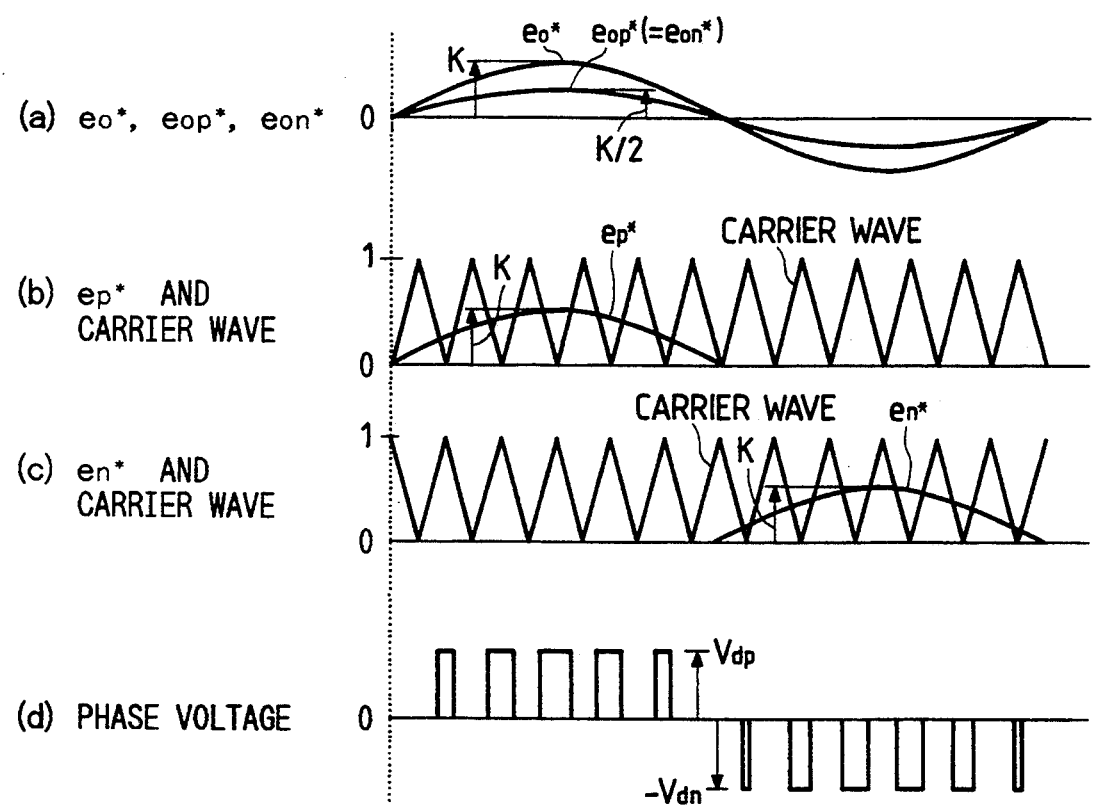
FIG. 4 is a diagram illustrating the operation of a unipolar modulation.

In the unipolar modulation of FIG. 4, when the amplitude K of the fundamental wave voltage instruction $e_0^*$, i.e., when the crest value K of the positive-side voltage instruction $e_p^*$ and of the negative-side voltage instruction $e_n^*$ becomes greater than a crest value (=1) of the carrier triangular waves as shown in FIGS. 5a), 5(b) and 5(c), the invertor 3 outputs, as an output phase voltage, a pulse voltage which has the same polarity as the fundamental wave and in which the number of pulses is reduced during the half period of the fundamental wave as shown in FIG. 5(d). This is a so-called over-modulation.

Figure 5:
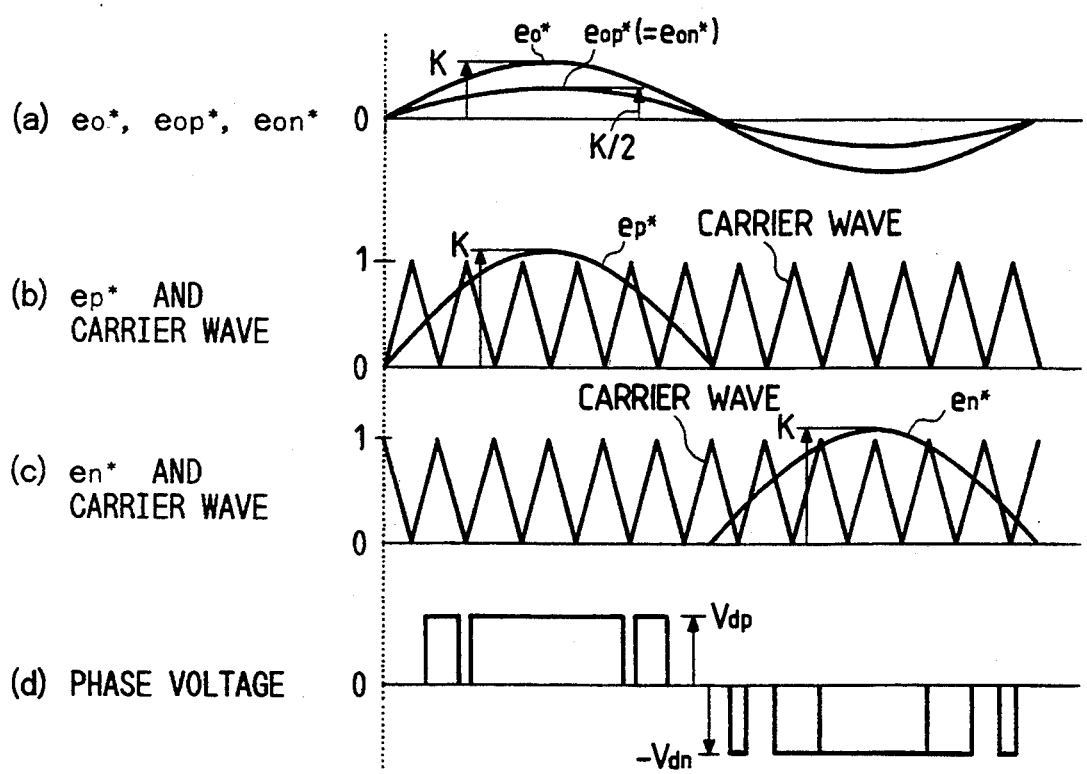
FIG. 5 is a diagram illustrating the operation of an over-modulation.

In the over-modulation of FIG. 5, when the amplitude K of the fundamental wave voltage instruction $e_0^*$, i.e., when the crest value K of the positive-side voltage instruction $e_p^*$ and of the negative-side voltage instruction $e_n^*$ becomes further greater than the crest value (=1) of the carrier triangular waves as shown in FIGS. 6(a), 6(b) and 6(c), the invertor 3 produces a pulse voltage which has the same polarity as the fundamental wave and in which the number of pulses is one during the half period of the fundamental wave as shown in FIG. 6(d). This is a so-called one-pulse modulation.

The aforementioned shifting of modulation system is carried out depending, for example, upon the amplitude K of the fundamental wave voltage instruction $e0^*$. Which modulation system will be used varies depending upon the application where the electric motor is used. In the case of the apparatus for controlling an electric car, however, it is desired that the power running and braking (regenerative) are controlled in the order mentioned above.

Next, described below with reference to FIG. 7 in conjunction with the dipolar modulation system is an electric current hat flows into or out of the neutral point N in the case where the DC components of DC voltages $V_{dp}$ and $V_{dn}$ divided by the capacitors 22 and 23 are equilibrated.

A positive-side voltage instruction $e_p^*$ of FIG. 7(b) and a negative-side voltage instruction $e_n^*$ of FIG. 7(c) obtained from the two divided voltage instructions $e_{op}^*$ and $e_{on}^*$ based on the fundamental wave voltage instruction $e_0^*$ of FIG. 7(a), are compared with a carrier triangular wave as described above, in order to obtain an invertor output phase voltage as shown in FIG. 7(d). In this case, if harmonic components are neglected, a current of a sinusoidal wave form without DC component as shown in FIG. 7(e) flows into the induction motor 4.

FIG. 7(f) illustrates a switching function expressing, using 1 and 0, the condition of current flowing into or out of the neutral point N. Numeral 1 represents the condition where the current is flowing, which corresponds to a period in which the invertor output phase voltage of FIG. 7(d) is zero. Numeral 0 represents the condition where no current is flowing, which corresponds to a period in which the invertor output phase voltage of FIG. 7(d) is not zero.

The switching function multiplied by the current of the motor 4 represents a current of one phase of the invertor 3 that flows into the neutral point N, as shown in FIG. 7(g) in which the current is equilibrated in the positive and negative cycles, and no DC component is included.

Therefore, the DC components of DC voltages $V_{dp}$ and $V_{dn}$ divided by the capacitors 22 and 23 are equilibrated.

However, when the capacitances of the capacitors 22 and 23 are not equilibrated or when DC components are introduced into the current that flows into or out of the neutral point N due to variation in the width of output pulses of the invertor 3 caused by the turn-on and turn-off, operations of switching elements in the invertor 3, the DC components of DC voltages $V_{dp}$ and $V_{dn}$ divided by the capacitors 22 and 23 becomes out of equilibrium. As a result, an over-voltage is applied to the switching elements of the side of a higher DC voltage in the invertor 3; i.e., the switching elements may be damaged.

Prior art for suppressing the imbalance of DC components between DC voltages $V_{dp}$ and $V_{dn}$ divided by the capacitors 22 and 23 have been disclosed in the aforementioned Japanese Patent Laid-Open No. 101969/1990 which deals with the dipolar modulation system and in the aforementioned literature 2 which deals with the unipolar modulation system. Described below are the case where the suppressing technology disclosed in the literature 2 is adapted to the dipolar modulation system and the case where the suppressing technology disclosed in Japanese Patent Laid-Open No. 101969/1990 is adapted to the unipolar modulation system.

The suppressing technology disclosed in the literature 2 is a system which applies to the invertor output voltage instruction a signal that corresponds to a DC component of the differential voltage between DC voltages $V_{dp}$ and $V_{dn}$ divided by the capacitors 22 and 23.

Figure 7:
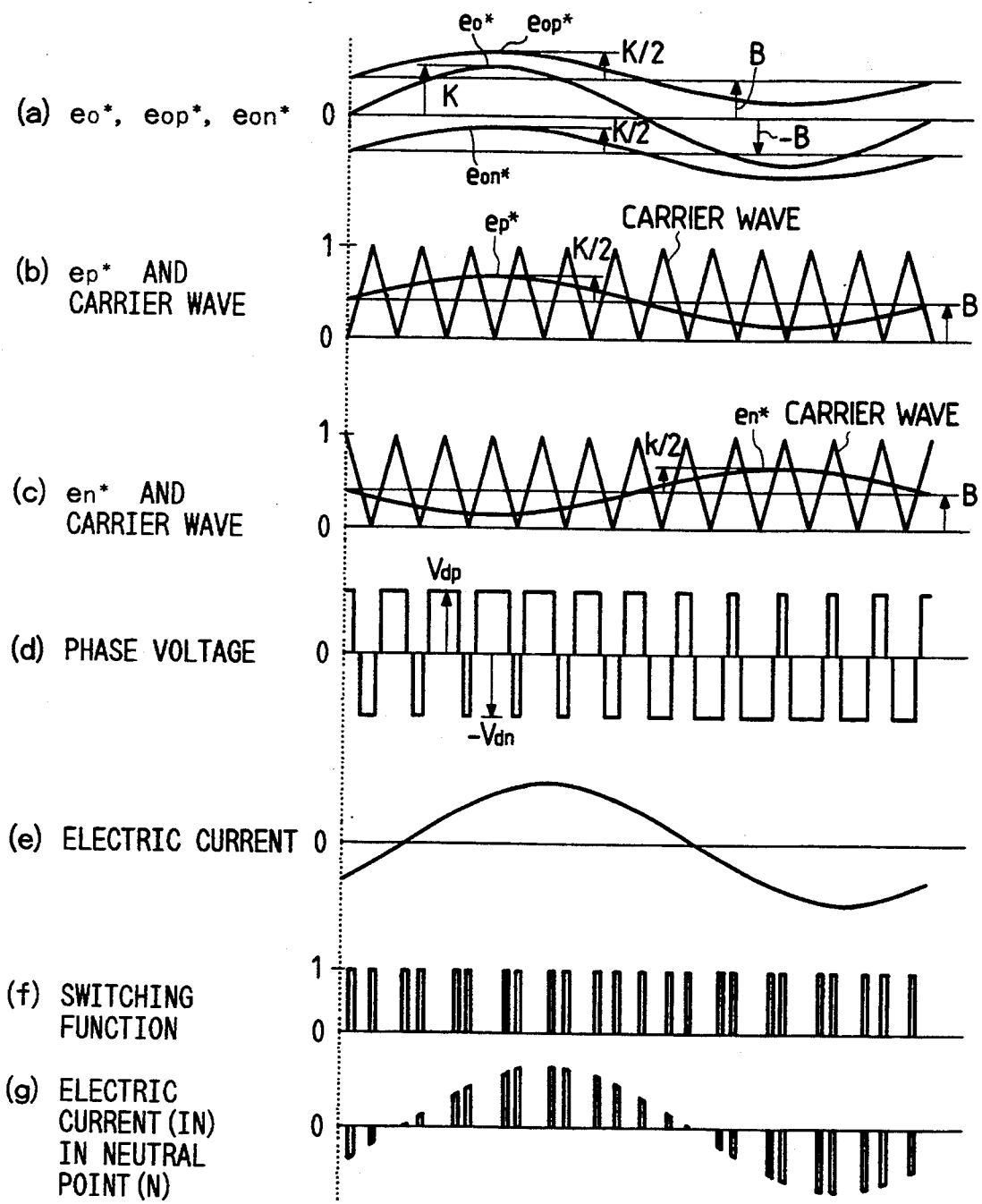
FIG. 7 is a diagram illustrating the operation of a current flowing into or out of the neutral point during the dipolar modulation.
Figure 8:
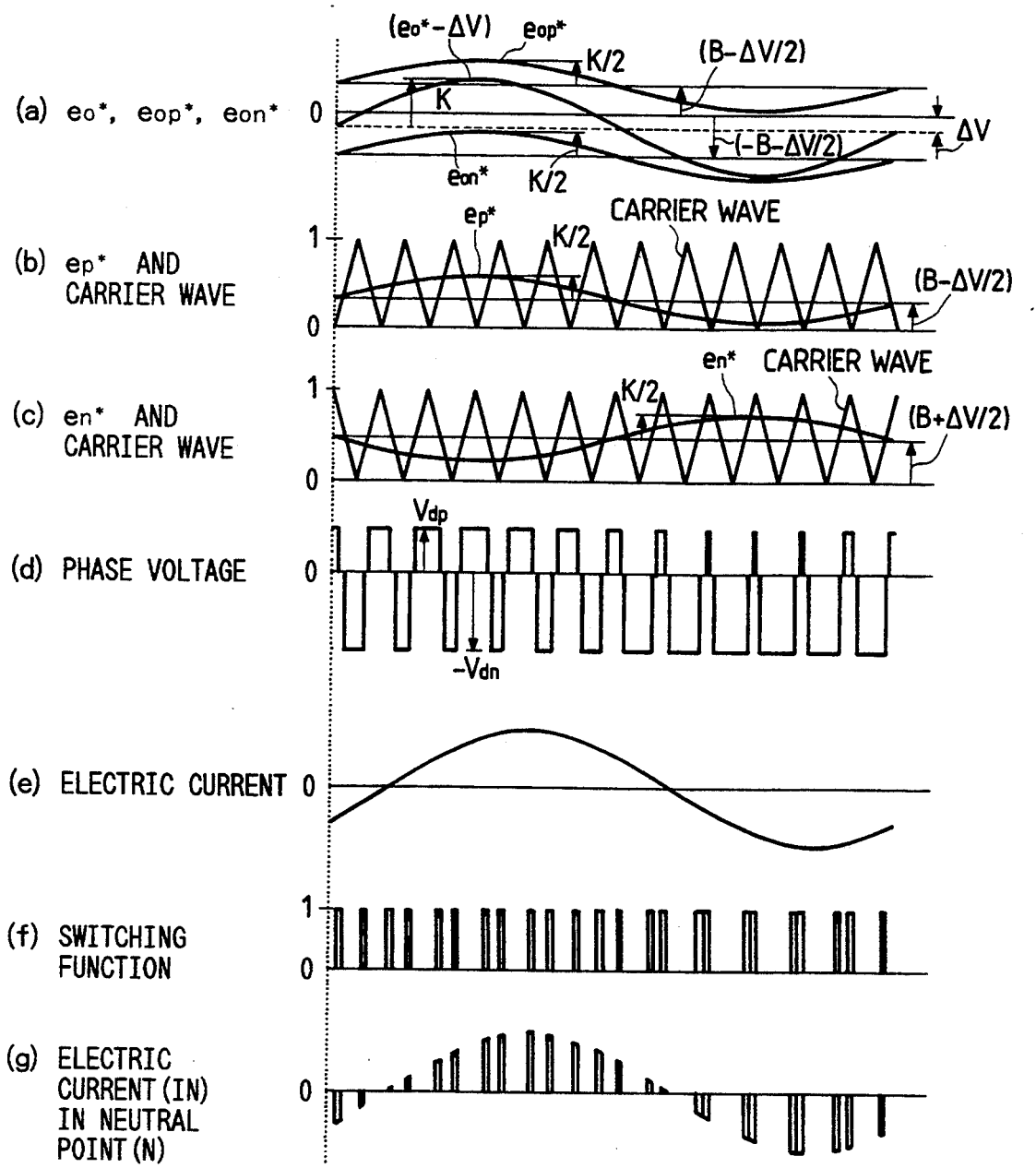
FIG. 8 is a diagram illustrating the operation of a case when a prior art is adapted to the dipolar modulation.

When this suppressing technology is adapted to the aforementioned dipolar modulation system (imbalance $V_{dp} < V_{dn}$ is taking place in FIG. 7) to add to the fundamental wave voltage instruction $e_0^*$ a signal $\Delta V$ that corresponds to a DC component of a differential voltage ($V_{dp} - V_{dn}$) between the DC voltages $V_{dp}$ and $V_{dn}$, then the divided voltage instructions $e_{op}^*$, on $e_{on}^*$, the positive-side voltage instruction $e_p^*$ and the negative-side voltage instruction $e_n^*$ undergo changes from FIGS. 7(a) to 7(c) into FIGS. 8a) to 8(c). As a result, the invertor output phase voltage becomes as shown in FIG. 8(d).

In this case the DC component included in the invertor output phase voltage is offset by a voltage across the output lines (e.g., across U-V) of the invertor 3 and does not appear. The DC component is not included in the current to the motor 4, either. Moreover, the switching function which expresses the condition of current flow at the neutral point N becomes as shown in FIG. 8(f). From the standpoint of positive and negative cycles of the fundamental wave voltage instruction $e_o^*$ however, the currents are balanced during a period in which the switching function is 1. Therefore, the current at the neutral point N obtained by multiplying the switching function by the current of the motor 4 of FIG. 8(e) is balanced in the positive and negative cycles as shown in FIG. 8(g), and no DC component is included. Therefore, the DC components of DC voltages $V_{dp}$ and $V_{dn}$ remain imbalanced. That is, no suppressing effect is obtained even when the suppressing technology disclosed in the literature 2 is adapted to the dipolar modulation system.

The suppressing technology disclosed in Japanese Patent Laid-Open No. 101969/1990 is a system which adjusts the amplitudes of the two modulated waves of a sinusoidal wave form and the shifting amount (bias amount) depending upon the DC component of the differential voltage between the DC voltages $V_{dp}$ and $V_{dn}$ divided by the capacitors 22 and 23.

Figure 9:
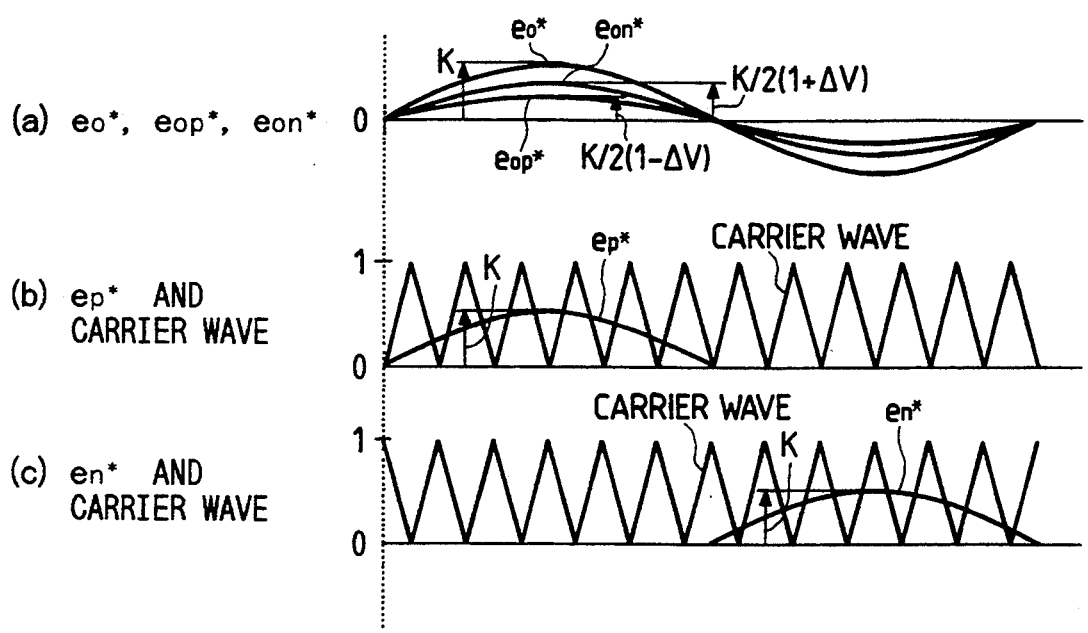
FIG. 9 is a diagram illustrating the operation of a case when a prior art is adapted to the unipolar modulation.

Even when this suppressing technology is adapted to the unipolar modulation system to adjust the amplitudes of the divided voltage instructions $e_{op}$ and $e_{on}^*$ as shown in FIG. 9(a) based on a signal $\Delta V$ which corresponds to the DC component of the differential voltage ($V_{dp} - V_{dn}$) between the DC voltages $V_{dp}$ and $V_{dn}$, the positive-side voltage instruction $e_p^*$ and the negative-side voltage instruction en* do not, after all, change since they are added up in the unipolar modulation. Therefore, equilibrium is maintained as shown in FIGS. 9(b) and 9(c).

In the unipolar modulation system, therefore, the suppressing technology disclosed in Japanese Patent Laid-Open No. 101969/1990 does not work to suppress the imbalance of the DC components of DC voltages $V_{dp}$ and $V_{dn}$.

In order to suppress the imbalance (e.g., $V_{dp} < V_{dn}$) between the DC voltages $V_{dp}$ and $V_{dn}$ divided by the capacitors 22 and 23 according to the embodiment of FIG. 1, therefore, the polarity of the fundamental sinusoidal wave output by a sinusoidal wave (sin) generating means 511 is discriminated, distributed and output as 1 and 0 by polarity discrimination/distributors 542p and 542n in the voltage imbalance suppressing means 54 of the modulation means 5. These outputs and the signal $\Delta V$ (the signal here has a negative sign since $V_{dp} < V_{dn}$) which corresponds to the DC component of the differential voltage ($V_{dn}$ and $V_{dn}$) between the DC voltages $V_{dp}$ and $V_{dp}$ output by a differential voltage detecting means 541, are multiplied together through multipliers 543p and 543n, and the signal $\Delta V$ is output being divided into $\Delta V_p$ and $\Delta V_n$ as shown in FIG. 10(b).

The divided signals $\Delta V_p$ and $\Delta V_n$ are added to the divided voltage instructions $e_{op}^*$ and $e_{on}^*$ of FIG. 10(a), respectively, to obtain a positive-side voltage instruction $e_p^*$ shown in FIG. 10(c) and a negative-side voltage instruction $e_n^*$ shown in FIG. 10(d).

As a result the invertor output phase voltage becomes as shown in FIG. 10(e). That is, the positive output pulse of the invertor decreases having the same polarity as the fundamental wave voltage instruction $e_0^*$ and the negative output pulse of the invertor increases having the same polarity as the fundamental wave voltage instruction $e_0^*$. At this moment, the neutral point period of the positive side increases and the neutral point period of the negative side decreases, and whereby the switching function which expresses the condition of current flow at the neutral point N becomes as shown in FIG. 10(g). That is, in the period corresponding to the switching function of 1, imbalance occurs from the standpoint of positive and negative cycles of the fundamental wave voltage instruction $e_o^*$. Therefore, the current at the neutral point N including the current of the motor 4 of FIG. 10(f) superposed on the switching function becomes out of balance between the positive cycle and the negative cycle as shown in FIG. 10(h) and includes a positive DC component as indicated by a broken line. The positive DC component works to electrically charge the capacitor 22, to electrically discharge the capacitor 23, to increase the DC voltage $V_{dp}$, to decrease the DC voltage $V_{dn}$, and hence to suppress the imbalance ($V_{dp} < V_{dn}$) of DC components between the DC voltages $V_{dp}$ and $V_{dn}$. Moreover, the DC component included in the invertor output phase voltage is canceled by the voltage across the output lines (e.g., across U-V) and does not appear. The DC component is not included in the current of the motor 4, either.

Figure 10:
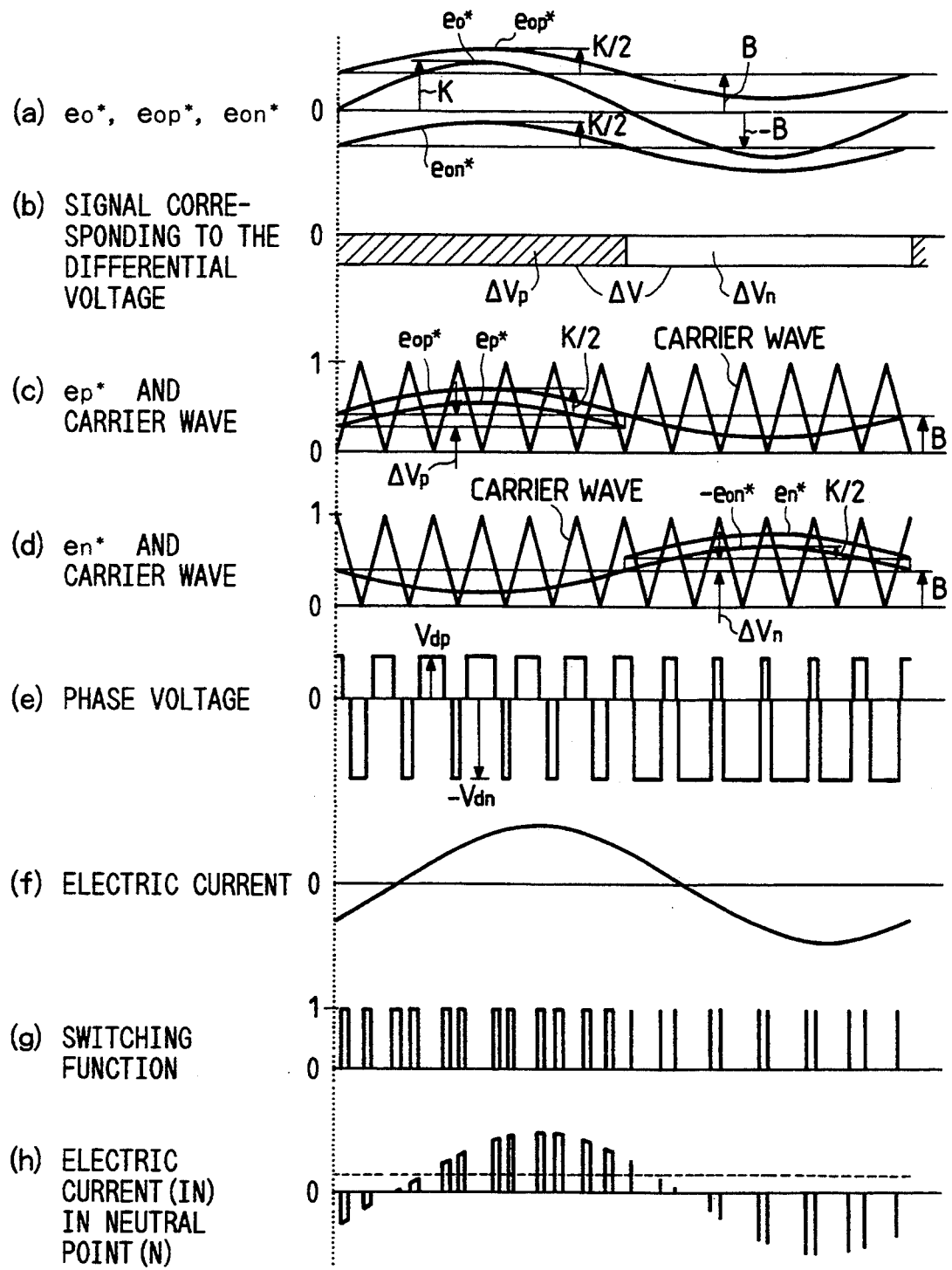
FIG. 10 is a diagram illustrating the operation of the dipolar modulation according to the present invention.

FIG. 10 shows the case of a power mode. In the case of a regenerative mode, the current of the motor 4 has an opposite polarity to that of FIG. 10(f). Therefore, the DC component included in the current at the neutral point N has an opposite polarity to the broken line of FIG. 10(h). Therefore, the signals $\Delta V_p$ and $\Delta V_n$ divided from the signal $\Delta V$ that corresponds to the DC component of the differential voltage ($V_{dp} - V_{dn}$) between the DC voltages $V_{dp}$ and $V_{dn}$, must be so switched as to have a polarity opposite to that of FIG. 10(b).

As described above, this embodiment makes it possible to easily and effectively suppress the imbalance of DC components between the DC voltages $V_{dp}$ and $V_{dn}$ in the dipolar modulation system.

Figure 11:
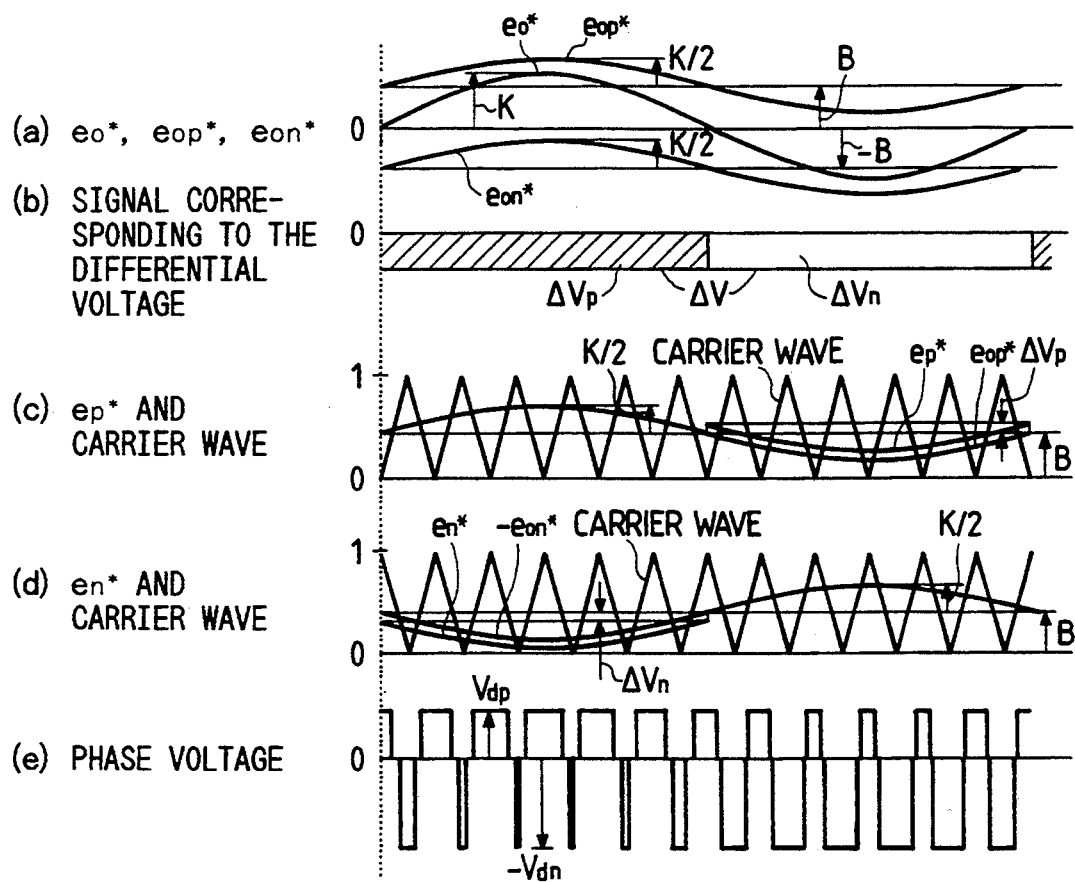
FIG. 11 is a diagram illustrating the operation of the dipolar modulation according to another embodiment of the present invention.

According to a modified embodiment adapted to the dipolar modulation system, the same suppressing effect is obtained by subtracting $\Delta V_p$ from the voltage instruction $e_{on}^*$ and subtracting $\Delta V_n$ from the voltage instruction $e_{op}$* as shown in FIG. 11 in order to adjust the width of the output pulse of the invertor of an opposite polarity to the fundamental wave voltage instruction $e_0$* (the pulse width of the negative side is narrowed when the fundamental wave voltage instruction $e_o$* is positive and on the other hand the pulse width of the positive side is broadened when it is negative), instead of adjusting the width of the invertor output pulse having the same polarity as the fundamental wave voltage instruction $e_o$* by adding $\Delta V_p$ to the voltage instruction $e_{op}$* and adding $\Delta V_n$ to the voltage instruction $e_{on}$* as shown in FIG, 10. In FIGS. 10 and 11, furthermore, the same suppressing effect is obtained even when the pulse width of one side only is put into action, i.e. even when $\Delta V_p$ only is put into action or even when $\Delta V_n$ only is put into action.

Figure 12:
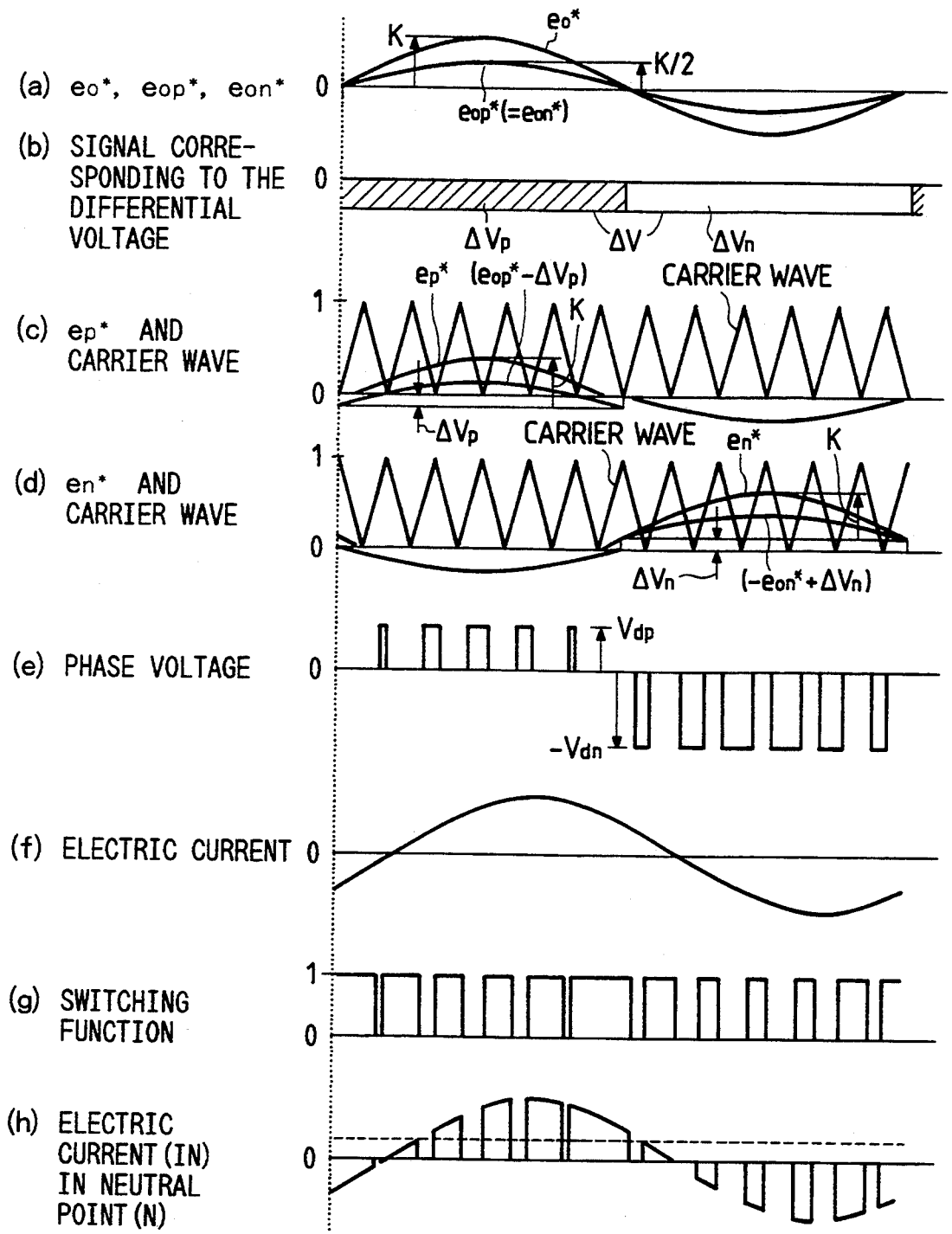
FIG. 12 is a diagram illustrating the operation of the unipolar modulation according to the present invention.

Next, when shifted into the unipolar modulation system while setting the bias amount B to 0, the divided voltage instructions $e_{op}$* and $e_{on}$* become as shown in FIG. 12(a). Furthermore, a positive-side voltage instruction $e_p$* and a negative-side voltage instruction $e_n$* obtained by adding $\Delta V_p$ and $\Delta V_n$ of FIG. 12(b) to the above voltage instructions become as represented by thick lines in FIGS. 12(c) and 12(d). Accordingly, the output phase voltage of the invertor becomes as shown in FIG. 12(e). In this case, the DC component included in the invertor output phase voltage is canceled by the voltage across the output lines (e.g., across U-V) of the invertor 3 and does not appear. Therefore, no DC component is included in the current of the motor 4, either.

Moreover, the switching function that expresses the condition of current flow at the neutral point N becomes as shown in FIG. 12(g), and in the period corresponding to the switching function of 1, imbalance occurs from the standpoint of positive and negative cycles of the fundamental wave voltage instruction $e_0$*. Therefore, the current at the neutral point N obtained by multiplying the switching function by the current of the motor 4 of FIG. 12(f) becomes out of balance in the positive and negative cycles is shown in FIG. 12(h) and includes a positive DC component as indicated by a broken line. The positive DC component works to electrically charge the capacitor 22, to electrically discharge the capacitor 23, to increase the DC voltage $V_{dp}$, to decrease the DC voltage $V_{dn}$, and to suppress the imbalance ($V_{dp} < V_{dn}$) of DC components between the DC voltages $V_{dp}$ and $V_{dn}$.

Figure 3:
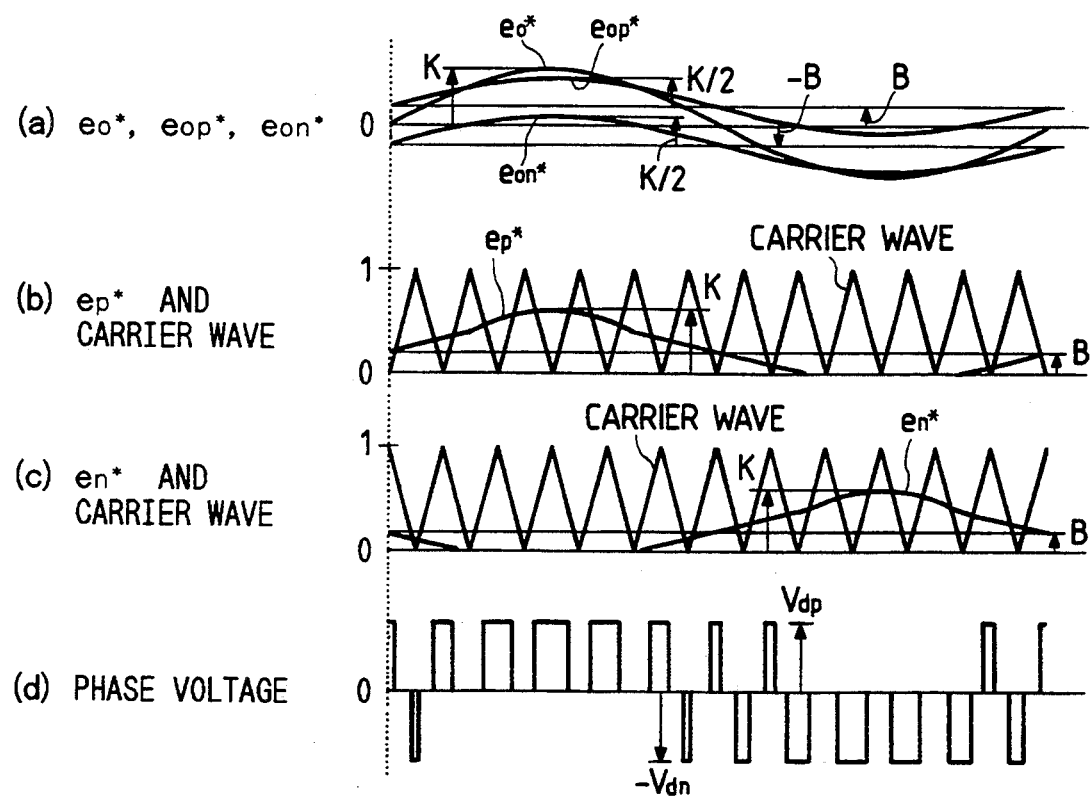
FIG. 3 is a diagram illustrating the operation of a partial dipolar modulation.
Figure 6:
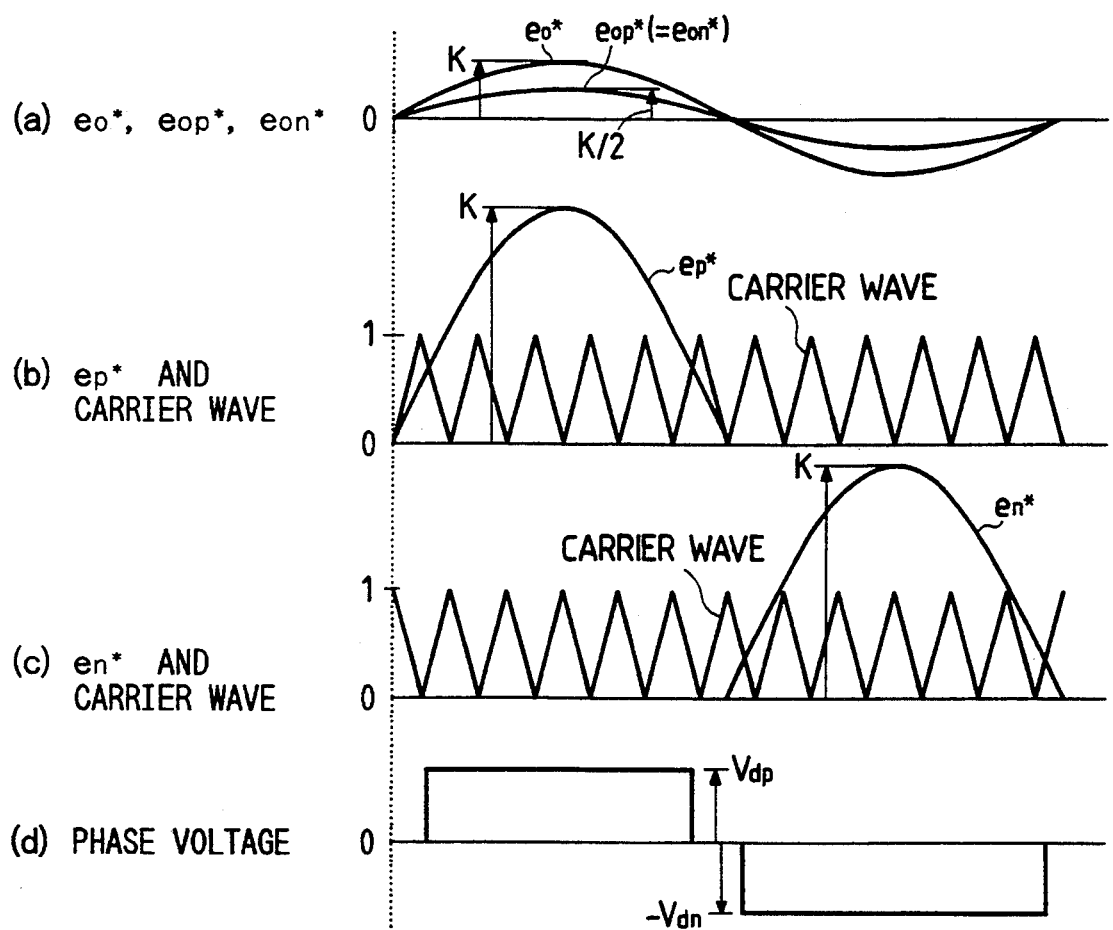
FIG. 6 is a diagram illustrating the operation of a one-pulse modulation.

It can be further understood that the imbalance of DC components between the DC voltages $V_{dp}$ and $V_{dn}$ can be suppressed in the same manner even in the partial dipolar modulation system of FIG. 3, in the over-modulation system of FIG. 5, and in the one-pulse modulation system of FIG. 6.

As described above, the embodiment of the invention improves the system for suppressing the imbalance of DC components between the DC voltages $V_{dp}$ and $V_{dn}$ in the dipolar modulation system, and can readily be adapted to other modulation systems than the dipolar modulation system.

In an apparatus for controlling an electric car to which are adapted the dipolar modulation system and another modulation system, furthermore, the embodiment of the invention makes it possible to carry out the operation for suppressing the imbalance of DC components between the DC voltages $V_{dp}$ and $V_{dn}$ commonly in all of the modulation systems, contributing to simplifying the suppress control.

According to this embodiment, it needs not be pointed out that the aforementioned suppressing effect is obtained even when the signal $\Delta V$ that corresponds to the DC component of a differential voltage between the DC voltages $V_{dp}$ and $V_{dn}$ output by the differential voltage detecting means 541 in the voltage imbalance suppressing means 54 in the modulation means 5 is output being divided into $\Delta V_p$ and $\Delta V_n$ of a half-wave sinusoidal shape as shown in FIG. 13 instead of being divided into $\Delta V_p$ and $\Delta V_n$ of a square wave form of FIG. 10(b). For this purpose, the polarity discrimination/distributors 542p and 542n in the voltage balancing means 54 of the embodiment of FIG. 1 should be changed into those like polarity discrimination/distributors 526p and 527p in the voltage instruction dividing means 52.

The present invention can, as a matter of course, be adapted even to a dipolar modulation system different from the dipolar modulation system described in conjunction with FIG. 2. That is, the invention can be adapted even to a dipolar modulation system which forms two divided voltage instructions $e_{op}$* and $e_{on}$* of a half-wave sinusoidal shape as shown in FIG. 14(a), forms a positive-side voltage instruction $e_p$* of FIG. 14(b) and a negative-side voltage instruction $e_n$* of FIG. 14(c) from the voltage instructions $e_{op}$ and $e_{on}$* and alternatingly generates positive and negative output pulses of the invertor via zero voltage as shown in FIG. 14(d) while maintaining constant the width of the output pulses that have a polarity opposite to the fundamental wave of the invertor output phase voltage.

In the three-level invertor to which are adapted the dipolar modulation system and another modulation system, furthermore, it needs not be pointed out that there may be provided a means which switches the system for suppressing the imbalance of DC components between the DC voltages $V_{dp}$ and $V_{dn}$ depending upon the modulation systems (e.g., technology disclosed in Japanese Patent Laid-Open No. 101969/1990 as for the dipolar modulation system, and technology disclosed in the literature 2 as for the unipolar modulation system).

FIG. 15 shows an another embodiment of the present invention and is the same construction as that in FIG. 1 except the unbalance voltage suppressing means 54 in the modulating means 5.

In the embodiment shown in FIG. 1, the unbalance voltage between the capacitors is mainly suppressed in powering of the induction motor 4. On the contrary in the embodiment shown in FIG. 15, the unbalance voltage between the capacitors may be suppressed not only in powering but in braking of the induction motor 4.

A polarity selecting means 544 and a multiplier 545 are added to the unbalance voltage suppressing means 54 as shown in FIG .15, and the polarities of the voltages $\Delta V_p$ and $\Delta V_n$ are changed.

That is, the polarity selecting means 544 outputs a signal "1" when driving the motor 4 in powering and outputs a signal "1" when driving it in braking on the basis of powering/braking order from an operator. The multiplier 545 inverts the polarity of the voltages $\Delta V_p$ and $\Delta V_n$ in powering and braking by reversing the output of the fundamental wave generating means depending on the output of the polarity selecting means 511.

Furthermore, in stead of said powering/braking order from the operator, a polarity of an electric power obtained from output voltage and output current, or a DC voltage and a DC current may be used.

In this embodiment shown in FIG. 15, the unbalance voltage is always suppressed in both of powering and braking of the motor 4.

The present invention makes it possible to easy and effectively suppress the imbalance of DC components between the two DC voltages in the dipolar modulation system.

In an apparatus for controlling an electric car to which are adapted the dipolar modulation system and another modulation system, furthermore, it is allowed to simplify the operation for suppressing the imbalance of DC components between the two DC voltages.

We claim:

1. A power converter comprising:
   capacitors connected in series so as to divide a DC voltage;
   a DC/AC converter for converting said DC voltage charged on said capacitors into an AC output phase voltage having positive, zero and negative levels, which said output phase voltage is supplied to a load; and
   a modulation means for supplying said DC/AC converter with a signal so as to generate a sequence of alternating output pulses with interleaving zero-level pulses between a half cycle of a fundamental wave of said output phase voltage of said DC/AC converter and adjusting a width of only either one of the positive and negative output pulses in said half cycle of the fundamental wave of said output phase voltage depending upon a DC component of a difference between voltages on said capacitors.

2. A power converter as claimed in claim 1, wherein the said modulations means adjusts said width according to at least one of a powering and a braking state of said load.

3. A power converter comprising:
   capacitors connected in series so as to divide a DC voltage;
   a DC/AC converter for converting said DC voltage charged on said capacitors into an AC output phase voltage having positive, zero and negative levels, which said output phase voltage is supplied to a load; and
   a modulation means for supplying said DC/AC converter with a signal so as to generate a sequence of alternating output pulses with interleaving zero-level pulses between a half cycle of a fundamental wave of said output phase voltage of said DC/AC converter and adjusting a width of only said output pulses having a same polarity as said fundamental wave of said output phase voltage depending upon a DC component of a difference between voltages on said capacitors.

4. A power convertor as claimed in claim 3, wherein said modulation means adjusts said width according to at least one of a powering and a braking state of said load.

5. A power converter as claimed in claim 3, wherein said modulation means adjusts said width of said output pulses corresponding both to positive and negative polarities of said fundamental wave of said output phase voltage.

6. A power converter as claimed in claim 3, wherein said modulation means adjusts said width of said output pulse relying upon one of a positive polarity and a negative polarity of said fundamental wave of said output phase voltage.

7. A power converter comprising;
   capacitors connected in series so as to divide a DC voltage; and
   a DC/AC converter for converting said DC voltage charged on said capacitors into an AC output phase voltage having positive, zero and negative levels, which output phase voltage is supplied to a load; and
   a modulation means for supplying said DC/AC converter with a signal so as to generate a sequence of alternating output pulses with interleaving zero-level pulses between a half cycle of a fundamental wave of said output phase voltage of said DC/AC converter and adjusting a width of only said output pulses having a polarity opposite to said fundamental wave of said output phase voltage depending upon a DC component of a difference between a divided said DC voltage on said capacitors.

8. A power converter as claimed in claim 7, wherein said modulation means adjusts said width according to at least one of a powering and a braking state of said load.

9. A power converter as claimed in claim 7, wherein said modulation means adjusts said width of said output pulses corresponding both to positive and negative polarities of said fundamental wave of said output phase voltage.

10. A power converter as claimed in claim 7, wherein said modulation means adjusts said width of said output pulse corresponding to one of a positive polarity and a negative polarity of said fundamental wave of said output phase voltage.

11. A power converter comprising:
    capacitors connected in series to divide a DC voltage;
    a DC/AC converter for converting direct current fed from said capacitors into an AC output phase voltage having positive, zero and negative levels; and
    a modulation means which divides a fundamental wave voltage instruction formed based on an amplitude instruction of a voltage and a frequency instruction output to said DC/AC converter into a positive-side voltage instruction for generating positive output pulses on a phase of said DC/AC converter and a negative-side voltage instruction for generating negative output pulses, and then forms a signal based on said positive-side and said negative-side voltage instructions to turn on or off switching elements that constitute said DC/AC converter, distributes distribution signals corresponding to DC components of a difference between voltages on said capacitors depending upon a polarity of said fundamental wave voltage instruction, and superposes said distribution signals on one of said positive-side voltage instruction and said negative-side voltage instruction.

12. A power converter as claimed in claim 11, wherein said modulation means distributes said distribution signals depending on said polarity and at least one of a powering and a braking state of a load.

13. A power converter as claimed in claim 11, wherein said modulation means superposes on one of said positive-side voltage instruction and said negative-side voltage instruction, said distribution signals having a same polarity as said positive-side voltage instruction and said negative-side voltage instruction.

14. A power converter as claimed in claim 11, wherein said modulation means superposes on one of said positive-side voltage instruction and said negative-side voltage instruction, said distribution signals having a polarity opposite to said positive-side voltage instruction and said negative-side voltage instruction.

15. An apparatus for controlling an electric car comprising:
   capacitors connected in series to divide a DC voltage;
   a DC/AC converter for converting direct current fed from said capacitors into an AC output phase voltage having positive, zero and negative levels;
   an AC motor driven by said output phase voltage from said DC/AC converter; and
   a modulation means which has a first modulation mode in which said DC/AC converter is supplied with a signal for generating a sequence of alternating output pulses with interleaving zero-level pulses in response to a voltage instruction and a frequency instruction fed to said DC/AC converter, a sequence of pulses corresponding to half a cycle of a fundamental wave of said output phase voltage of said DC/AC converter, and a second modulation mode in which said DC/AC converter is supplied with a signal for generating a sequence of output pulses different from a sequence of output pulses of said first modulation mode and adjusting a width of only either one of a positive and negative output pulse in a half cycle of said fundamental wave of said output phase voltage depending upon an imbalance of DC components between a divided said DC voltages in said first modulation mode and in said second modulation mode.

16. An apparatus for controlling an electric car as claimed in claim 15, wherein said second modulation mode includes at least one of the following modes:
   a partial dipolar modulation mode in which a phase voltage of said DC/AC converter includes a sequence of alternating output pulses with interleaving zero-level pulses and a series of pulses having a same polarity as said fundamental wave of said output phase voltage in each half cycle of said fundamental wave of said output phase voltage;
   a unipolar modulation mode in which a phase voltage of said DC/AC converter includes a sequence of output pulses of a same polarity as said fundamental wave of said output phase voltage, and a plurality of output pulses are output in a half cycle of said fundamental wave of said output phase voltage;
   an over-modulation mode in which a number of output pulses having a same polarity as said fundamental wave of said output phase voltage and included in a half cycle of said fundamental wave of said output is smaller than a number of said output pulses included in a half period of said fundamental wave of said output phase voltage in said unipolar modulation mode; and
   a one-pulse modulation mode in which as a phase voltage of said DC/AC converter, a sequence of output pulses from said DC/AC converter have a same polarity as said fundamental wave of said output phase voltage, and only one output pulse is output in each half cycle of said output phase voltage.

17. An apparatus for controlling an electric car comprising;
   capacitors connected in series to divide a DC voltage;
   a DC/AC converter for converting direct current fed from said capacitors into an AC output phase voltage having positive, zero and negative levels;
   an AC motor driven by said output phase voltage from said DC/AC converter; and
   a modulation means which has a first modulation mode in which said DC/AC converter is supplied with a signal for generating a sequence of alternating output pulses with interleaving zero-level pulses in response to a voltage instruction and a frequency instruction fed to said DC/AC converter, said sequence corresponding to half a cycle of a fundamental wave of said output phase voltage of said DC/AC converter, and a second modulation mode in which said DC/AC converter is supplied with a signal for generating a second sequence of output pulses different from said sequence of said first modulation mode and adjusting only a width of an output pulse which has a same polarity as said fundamental wave of said output phase voltage of said DC/AC converter depending upon a DC component of a difference between a divided said DC voltage.

18. An apparatus for controlling an electric car according to claim 15, wherein said modulation means includes a means which divides a fundamental wave voltage instruction formed based on an amplitude instruction of a voltage and a frequency instruction output to said DC/AC converter into a positive-side voltage instruction for generating positive output pulses from said DC/AC converter and a negative-side voltage instruction for generating negative output pulses from said DC/AC converter, a means for providing a bias which changes into said positive-side and negative-side voltage instructions, and a means that forms a signal based on said positive-side and negative-side voltage instructions to turn on or off switching elements that constitute said DC/AC converter, and a means that distributes distribution signals corresponding to DC components of a difference between said divided DC voltages depending upon a polarity of said fundamental wave voltage instruction and superposes an output of said distribution signals on divided said positive-side and negative side voltage instructions.

* * * * *